US012677355B2

(12) United States Patent

Zoller

(10) Patent No.: US 12,677,355 B2

(45) Date of Patent: Jul. 7, 2026

(54) INDUCTION HEATING UNIT ADJUSTMENT DEVICE AND ADJUSTING METHOD FOR AN ADJUSTMENT OF AT LEAST ONE FIELD FORMER ELEMENT OF AN INDUCTION HEATING UNIT

(71) Applicant: E. Zoller GmbH & Co. KG Einstell—und Messgeraete, Pleidelsheim (DE)

(72) Inventor: Alexander Zoller, Pleidelsheim (DE)

(73) Assignee: E. ZOLLER GMBH & CO. KG EINSTELL—UND MESSGERAETE, Pleidelsheim (DE)

( * ) Notice: Subject to any disclaimer, the term of this patent is extended or adjusted under 35 U.S.C. 154(b) by 815 days.

(21) Appl. No.: 17/465,559

(22) Filed: Sep. 2, 2021

(65) Prior Publication Data

US 2022/0124879 A1 Apr. 21, 2022

(30) Foreign Application Priority Data

Sep. 3, 2020 (DE) ..................... 10 2020 123 070.2

(51) Int. Cl.
| | |
|---|---|
| *H05B 6/06* | (2006.01) |
| *B23P 11/02* | (2006.01) |
| *H05B 6/14* | (2006.01) |

(52) U.S. Cl.
CPC .............. *H05B 6/06* (2013.01); *B23P 11/027* (2013.01); *H05B 6/14* (2013.01)

(58) Field of Classification Search
CPC ................................. H05B 6/06; B23P 11/027

(Continued)

(56) References Cited

U.S. PATENT DOCUMENTS

| | | | |
|---|---|---|---|
| 12,358,085 B2 * | 7/2025 | Zoller | ................... B23P 11/027 |
| 2001/0054471 A1 | 12/2001 | Kelch | |

(Continued)

FOREIGN PATENT DOCUMENTS

| | | | |
|---|---|---|---|
| DE | 102005014984 A1 | 10/2006 | |
| DE | 202007000870 U1 * | 5/2007 | ......... B23B 31/1179 |
| DE | 102018121883 A1 * | 3/2020 | ......... B23B 31/1179 |

OTHER PUBLICATIONS

Machine Translation of DE202007000870U1 (Year: 2024).*

(Continued)

*Primary Examiner* — Edward F Landrum
*Assistant Examiner* — Thomas J Ward
(74) *Attorney, Agent, or Firm* — Womble Bond Dickinson (US) LLP

(57) ABSTRACT

An induction heating unit adjustment device for an adjustment of at least one field shape of an alternating field of an induction coil of an induction heating unit has a field forming unit which is configured for a, preferably variable, shaping and/or shielding of the alternating field generated by the induction coil, comprising at least one field former element and a field former receiving unit, which is configured to hold the field former element in and/or on the induction heating unit, wherein the induction heating unit adjustment device further has an electronic sensor unit, which is configured for sensing a type and/or a position of the field former element that is held in and/or on the induction heating unit by the field former receiving unit, and for outputting an electronic measurement signal.

9 Claims, 6 Drawing Sheets

Figure 1:
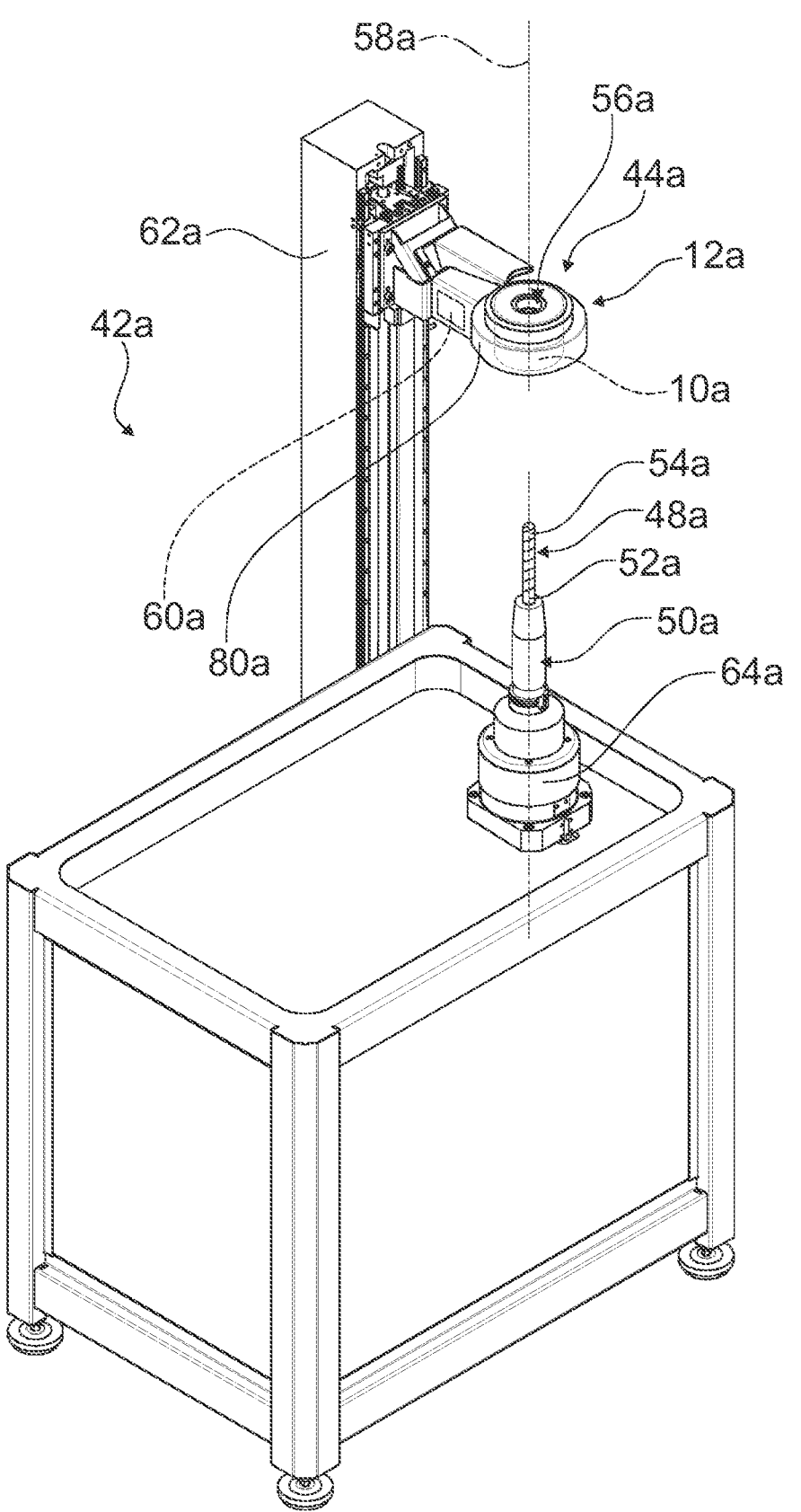

(58) Field of Classification Search
   USPC ......................................................... 219/490
   See application file for complete search history.

(56)                        References Cited

U.S. PATENT DOCUMENTS

2008/0277386 A1    11/2008  Haimer
2020/0061760 A1*    2/2020  Haimer ................ B23P 11/027

OTHER PUBLICATIONS

Machine Translation of DE102018121883A1 (Year: 2024).*
German Search Report on the Patentability of Application No. DE
10 2020 123 070.2 Mailed Aug. 19, 2021, 14 pages.
Extended European Search Report on the Patentability of Applica-
tion No. 21193746.1-1202, Mailed Jun. 28, 2021, 18 pages.
Anonymous: "Security Aspects and Prospective Applications of
RFID Systems", Jan. 1, 2005, 109 pages.
Anonymous: "Risiken und Chancen des Einsatzes von RFID-
Systemen", Jan. 1, 2005, 118 pages.

* cited by examiner

INDUCTION HEATING UNIT ADJUSTMENT DEVICE AND ADJUSTING METHOD FOR AN ADJUSTMENT OF AT LEAST ONE FIELD FORMER ELEMENT OF AN INDUCTION HEATING UNIT

STATE OF THE ART

The invention concerns an induction heating unit adjustment device according to the preamble of claim 1, an induction heating unit and an adjusting method.

An induction heating unit adjustment device for an adjustment of at least one field shape of an alternating field of an induction coil of an induction heating unit has already been proposed, with a field forming unit which is configured to shape and/or shield the alternating field generated by the induction coil, comprising at least one field former element and a field former receiving unit, which is configured to hold the field former element in and/or on the induction heating unit.

The objective of the invention is in particular to provide a generic device with advantageous characteristics regarding an adjustment of the field shape of the alternating field of the induction coil of an induction heating unit. The objective is achieved according to the invention by the features of the patent claims while advantageous implementations and further developments of the invention may be gathered from the subclaims.

Advantages of the Invention

The invention is based on an, in particular manually operable, induction heating unit adjustment device for a, preferably at least partially manual, adjustment of at least one field shape of an alternating field, in particular of a magnetic field shape of an induction magnetic field, of an induction coil of an induction heating unit, with a field forming unit, in particular a field re-forming unit, which is configured for a, preferably variable, shaping and/or shielding of the alternating field generated by the induction coil, in particular the induction magnetic field, comprising at least one field former element, in particular field re-former element, and a, preferably exclusively manually operable, field former receiving unit, which is configured to hold the field former element in and/or on the induction heating unit.

It is proposed that the induction heating unit adjustment device comprises an electronic sensor unit, which is configured for sensing, preferably detecting, a type and/or a position of the field former element that is held in and/or on the induction heating unit by the field former receiving unit, and for outputting an electronic measurement signal. This advantageously enables optimal field forming, in particular for different, preferably differently shaped, tool holders which are heatable by the induction heating unit. Advantageously, an optimized adjustment of the field forming unit for obtaining the optimal field shape is enabled, in particular for different, preferably differently shaped, tool holders which are heatable by the induction heating unit. Advantageously, it is possible to detect a, for example manual, adjustment of the field former elements that deviates from an optimal adjustment, in particular a misadjustment of the field former elements, such that misadjustment of the field former elements is preferably avoidable. This advantageously enables an optimization of an induction heating process, in particular as an energy consumption for a heating of the tool holder is minimized and/or as a heating of the tool holder outside a tool receiving region and/or a heating of a tool that is arranged in the tool receiving region can be minimized. Advantageously, a manual adjustment of the field former receiving unit can be simplified. This advantageously allows achieving a high level of operator-friendliness. The alternating field is preferably implemented as an, in particular high-frequency, (electro)magnetic alternating field, in particular as an induction magnetic field. The alternating field is in particular configured to induce in a tool holder, in particular in a preferably metallic, preferentially ferromagnetic, paramagnetic or diamagnetic, material that surrounds the tool receiving region of the tool holder, eddy currents which in their turn heat the material.

An "induction heating unit" is in particular to mean at least a portion, in particular a subassembly group, of an induction heating device, in particular of a shrink-clamping and/or unshrink-unclamping station, wherein in particular accessory units for the induction heating device may also be comprised, like for example a sensor unit for a measurement of a temperature of a tool holder or for a measurement of an energy consumption during the induction heating process. In particular, the induction heating unit may also comprise the entire induction heating device. In particular, the induction heating unit is configured to enable a shrink-clamping and/or unshrink-unclamping of tools into and/or out of tool holders by thermal expansion of a receiving region of a tool holder. The induction heating unit is in particular configured for heating tool holders. By a "tool holder" is in particular a component to be understood which is configured for receiving a tool and for a connection of the tool to a machine. In particular, the tool holder is implemented as a tool-machine interface. Preferably the tool holder is implemented as a tool chuck, in particular a shrink chuck, preferentially a heat-shrink chuck. The tool is in particular embodied as a shaft tool, preferably as a rotary shaft tool, for example as a drill, as a milling tool, as a profiling tool, and/or as a reamer. By a "shrink-clamping of tools into and/or out of tool holders" is in particular a shrink-clamping of tools into tool holders to be understood in which first the tool receiving region of the tool holder is thermally expanded, then a tool is introduced into the tool receiving region, and wherein eventually, after cooling of the tool holder, the tool is fixated in the tool holder by a force-fit connection, which in particular includes at least a friction-fit connection. By an "unshrink-unclamping of tools into and/or out of tool holders" is in particular a releasing of tools to be understood which are fixated in tool holders via a force-fit connection, in particular via a friction-fit connection, in which the tool receiving region of the tool holder is thermally expanded until the tool that is fixated in the tool holder is removable from the tool holder. The induction coil is in particular implemented as an inductor. The induction heating unit may comprise one inductor or several inductors. In particular, the inductor is configured for heating that portion of a tool holder which is arranged in an interior of the inductor that is arranged around a coil axis of the inductor. "Configured" is in particular to mean specifically programmed, designed and/or equipped. By an object being configured for a certain function is in particular to be understood that the object fulfills and/or executes said certain function in at least one application state and/or operation state.

By a "field former element" is in particular an element to be understood which is configured to selectively conduct and/or direct a magnetic field, in particular magnetic field lines of a magnetic field. In particular, the field former element realizes a shielding element, preferably an induction magnetic field shielding element. In particular, the field former element is implemented of a material that is magnetically conductive (magnetic permeability μ$_r$>1) and at the same time electrically non-conductive. In particular, the field former element is made at least partially of a ferrimagnetic oxide ceramic. In particular, the field former element realizes a ferrite element. In particular, the field former element is implemented at least partially of a soft-magnetic ferrimagnetic oxide ceramic. The field former element comprises, for example, a NiZn ferrite, a MnZn ferrite and/or a powder composite material that is based on an iron oxide. By the field forming unit being configured for a variable shaping of the alternating field generated by the induction coil is in particular to be understood that the field forming unit comprises different configurations which enable different field shapes. In particular, the field forming unit comprises different arrangements of movably supported field former elements or different exchangeable field former elements, which are configured to form differently-sized central openings for tools which are plugged or are to be plugged into the tool receiving regions of the tool holders, for example tools having different shaft shapes and/or shaft sizes. Preferably the field former elements are, in particular exclusively, manually movable in the field former receiving unit; and/or they are, in particular exclusively, manually exchangeable out of the field former receiving unit. Preferably the induction heating unit, preferentially the induction heating unit adjustment device, is free of a drive motor for a motorized movement of the field former elements. By an "at least partially manual adjustment of a field shape" is in particular to be understood that at least the movement of the field former elements, in particular within the field former receiving unit and/or during insertion into the field former receiving unit and/or during removal out of the field former receiving unit, is generated manually in an adjustment of the field shape and/or is free of any electrical controlling.

The electronic sensor unit in particular comprises at least one sensor, preferably at least one active sensor: In particular, the sensor generates the electronic measurement signal, for example on the basis of a mechanical measurement principle, of a resistive measurement principle and/or of an optical measurement principle. By the sensor unit sensing a "type of a field former element" is in particular to be understood that the sensor unit senses and/or detects which defined field former element from a selection of a plurality of field former elements ("exchangeable disks"), which are preferably insertable into the field former receiving unit such that they are (manually) exchangeable, is positioned in the field former receiving unit. By the sensor unit sensing a "position of a field former element" is in particular to be understood that the sensor unit senses and/or detects which position, in particular which rotational position and/or translational position, preferably which relative position to the induction coil, is currently occupied by at least one field former element which is supported (manually) movably in and/or by the field former receiving unit, in particular a field former element which is supported in and/or by the field former receiving unit such that it is (manually) translationally movable and/or (manually) rotationally movable, preferably from a plurality of field former elements arranged in the field former receiving unit. The electronic measurement signal in particular differs from a control and/or regulation signal of a motorized drive for a driving of field former elements in the field former receiving unit.

The electronic sensor unit, in particular the sensor, may be arranged at least partially or completely on the field former element (e.g. as an RFID element, as an electrical resistor element, or the like). Alternatively or additionally the electronic sensor unit, in particular the sensor, may be arranged at least partially or completely separately from the field former element (e.g. as a grid swept by the field former element, as a pressure switch operated by the field former element, or the like).

Furthermore, it is proposed that the induction heating unit adjustment device comprises an indicator unit, which is configured to output the type and/or the position of the field former element that is monitored and/or sensed, preferably detected, by the electronic sensor unit. In this way optimal field shaping is advantageously enabled, in particular for a variety of tool holders, which are preferably shaped differently and are heatable by the induction heating unit. Advantageously, an optimized adjustment of the field forming unit for obtaining the optimal field shape is enabled, in particular for a variety of tool holders, which are preferably shaped differently and are heatable by the induction heating unit. Advantageously a high level of operator-friendliness is achievable. In particular, the induction heating unit adjustment device comprises a control and/or regulation unit. A "control and/or regulation unit" is in particular to mean a unit with at least one control electronics member, preferably a controller. A "control electronics member" is in particular to mean a unit with a processor unit, preferably a processor, and with a memory unit, preferably a storage medium, and with an operation program that is stored in the memory unit. The control and/or regulation unit is in particular configured to receive, read and/or process the measurement signal and/or to control an indication of the indicator unit on the basis of the measurement signal. The control and/or regulation unit in particular comprises an input unit, for example a keyboard, a touchpad, or something like that. The input unit is preferably configured to provide an operator with an input opportunity for inputting, for example, a combination of tool and tool holder that is to be shrink-clamped or unshrunk-unclamped by the induction heating unit. In particular via the combination of tool and tool holder, the control and/or regulation unit determines an optimal type of the field former element or an optimal position of the field former element/field former elements.

In particular, the indication of the indicator unit depends on it—and/or is controlled accordingly by the control and/or regulation unit—that it indicates a match with the optimal type of field former element or with the optimal position of the field former element/field former elements, and/or that it indicates a deviation from the optimal type of field former element or of the optimal position of the field former element/field former elements. The input unit is in particular configured to provide the operator with an input opportunity for inputting a designated type of field former element or a designated position of the field former element/field former elements. In particular, the control and/or regulation unit carries out a, preferably automated, matching between a designated position of the field former element and/or a designated type of field former element, which is preferably determined on the basis of the input made via the input unit, and a current position of the field former element sensed and/or measured by the sensor unit and/or a current type of field former element sensed and/or measured by the sensor unit. Preferably the indication of the indicator unit is controlled by the control and/or regulation unit depending on a result of this matching. Preferably a current matching is outputted as a first indicator signal of the indicator unit. Preferably a current deviation is outputted as a second indicator signal of the indicator unit that differs from the first indicator signal of the indicator unit. Preferably, upon detection of a change causing a transition from a deviation to a match or a transition from a match to a deviation, the indication of the indicator unit changes, preferentially in real time or in approximate real time between the two indicator signals accordingly.

If the indicator unit comprises at least one luminous element, it is advantageously possible to achieve an especially simple, clear and/or user-friendly optimized adjustment of the field forming unit for obtaining the optimal field shape. The indicator unit preferably comprises more than one luminous element. In particular, the different luminous elements are configured to indicate different positions that can be occupied in the field former receiving unit by the movably supported field former elements, preferably different standard positions for defined typical types and/or sizes of tool holders. In particular, the different luminous elements are configured to indicate different types of field former elements which are insertable in the field former receiving unit, preferably different standard types for defined typical types and/or sizes of tool holders. In particular, the luminous element/s is/are embodied as (a) lighting emitting diode/s (LED/s). In particular, the luminous element/s is/are arranged on a housing of the indicator unit. In particular, the luminous element/s is/are arranged on the housing of the indicator unit side by side in a row. Alternative arrangements outside the housing of the indicator unit or an indication of the indicator signals via one or several screens are of course also conceivable.

If the indicator unit moreover comprises at least one color-changing element, in particular a luminous color-changing element, preferably a color-changing LED, advantageously an especially simple, clear and/or user-friendly optimized adjustment of the field forming unit for obtaining the optimal field shape is achievable. For example, the first indicator signal may be implemented as a green glow of the color-changing element. For example, the second indicator signal may be implemented as a red glow of the color-changing element. Alternative color selections are of course conceivable. Alternatively or additionally it is moreover conceivable that the indicator unit outputs indicator signals in the form of brightness changes of the indicator elements or in the form of different blinking signals created by the indicator elements.

It is further proposed that the indicator unit is configured to indicate a deviation from a pre-selected type of field former element and/or a deviation from a pre-selected position of the field former element by means of a deviation signal. This advantageously enables an especially simple, clear and/or user-friendly optimized adjustment of the field forming unit for obtaining the optimal field shape. The deviation signal is in particular realized as the second indicator signal. The pre-selected type of field former element in particular corresponds to the designated type of field former element determined via the input in the input unit. The pre-selected position of the field former element in particular corresponds to the designated position of the field former element determined via the input in the input unit. The color-changing luminous element is in particular configured to indicate the deviation signal and/or the second indicator signal.

It is also proposed that the indicator unit is configured to indicate a match with a pre-selected type of field former element and/or a match with a pre-selected position of the field former element by means of a matching signal. This advantageously enables an especially simple, clear and/or user-friendly optimized adjustment of the field forming unit for obtaining the optimal field shape. The matching signal is in particular realized as the first indicator signal. The color-changing luminous element is in particular configured to indicate the matching signal and/or the first indicator signal. In particular, an identical luminous element, in particular color-changing luminous element, is configured for an indication of the deviation signal and of the matching signal. In particular, each luminous element, preferably each color-changing luminous element, is assigned to exactly one of several typical positions of the field former elements and/or to exactly one of several possible typical types of field former elements.

Beyond this it is proposed that the electronic sensor unit is configured to monitor an, in particular manual, adjustment process that influences the type or the position of the field former element and, depending on a matching of the type or of the position of the field former element with the pre-selection, to output the deviation signal or the matching signal by means of the color-changing element, in particular by means of the color-changing element that is assigned to the pre-selected type of field former element and/or by the pre-selected position of the field former element that is assigned to the pre-selected type of field former element. This advantageously enables an especially simple, clear and/or user-friendly optimized adjustment of the field forming unit for obtaining the optimal field shape.

If the field former element forms at least a portion of an iris aperture with an iris opening that is variable in size, it is advantageously possible to adjust a desired size of the iris opening via the positioning of the field former element monitored by the electronic sensor unit. Advantageously an especially simple accurate adjustment of the size of the iris opening is enabled. Advantageously a high level of user-friendliness is achievable. Advantageously, by the iris aperture optimal field forming is achievable for the shrink-clamping and/or unshrink-unclamping of different tools into and/or out of different tool holders. In particular, the field former elements realize blades of a leaf shutter, which are in particular arranged analogously to an iris aperture and/or analogously to a central shutter of a camera and are movable relative to one another. In particular, the iris aperture comprises several lamellae, e.g. four, five, six, seven or eight lamellae, which are preferably together rotatable inwards or outwards by means of a mechanical member. In particular, each lamella is herein supported on a shaft. Preferably all lamellae are connected to one another via the field former receiving unit, in particular via a ring element of the field former receiving unit, which is configured to generate and/or direct a movement done by the lamellae together. In particular, the lamellae together form the iris opening that is variable in size. In particular, the iris opening that is variable in size is arranged in a center of the field forming unit implemented by all lamellae of the field forming unit. In particular, a shape of the size-variable iris opening formed by the field former elements corresponds to a polygon, whose number of corners is preferably equal to a number of field former elements of the field forming unit.

If, in particular as an alternative to the iris aperture, the field former element forms at least a portion of an exchangeable disk of a plurality of exchangeable disks which are exchangeably insertable in the field former receiving unit and which in each case have a differently sized, in particular central, opening, it is advantageously possible to adjust a desired size of the, in particular central, opening via the type of field former element monitored by the electronic sensor unit. Advantageously, an especially simple accurate size adjustment of the, in particular central, opening is enabled. Advantageously a high level of user-friendliness is achievable. Advantageously optimal field forming can be obtained by selecting suitable exchangeable disks for the shrink-clamping and/or unshrink-unclamping of different tools into and/or out of different tool holders. In particular, the field former elements realize flat, preferably annular-disk-shaped exchangeable disks, which are preferably encompassed at their peripheral edge by a plastic ring, which in particular forms the ring element.

If the electronic sensor unit comprises a potentiometer, in particular for capturing a respective current position of the field former element in the field former receiving unit and/or for capturing a type of the field former element that is currently arranged in the field former receiving unit, it is advantageously possible to obtain a reliable and/or cost-efficient implementation of the electronic sensor unit, which moreover preferably has a long lifetime and/or permits a high number of cycles. In particular, a pickup of the potentiometer contacts the field former element in order to determine the current position of the movable field former element in the field former receiving unit and/or a type of the field former element that is currently inserted in the field former receiving unit via a measurement of a resistance value currently present at the potentiometer. In particular, the potentiometer forms an electronic conductive contact to the field former element that is supported in the field former receiving unit. Preferably the potentiometer forms a slide contact with the field former element that is movably supported in the field former receiving unit.

Alternatively it is proposed that the electronic sensor unit comprises a switch and/or grid coding, in particular for a capturing of a respective current position of the field former element in the field former receiving unit. Herein in particular at least one field former element, preferably each field former element, and/or an element comprising the field former element and/or the field former elements, preferentially the ring element, has a mechanical coding. The mechanical coding is preferably embodied in the form of studs or holes. The induction heating unit in particular comprises a multiple (pressure) switch, for example a quadruple (pressure) switch, or several, e.g. four, single switches, in particular single pressure switches, which are preferably configured to interact with the mechanical coding, preferentially to read the mechanical coding. For example, depending on the position of a field former element, some of the switches assigned to this field former element are activated, i.e. in particular pressed, by the mechanical coding which belongs to this field former element. For example, a field forming unit with field former elements ("iris lamellae"), which are displaceable into five different designated positions, comprises four single pressure switches. In the first designated position of the field former element (e.g. the position with the smallest iris opening), the field former element is positioned so as to press none of the single pressure switches (signal 0). In the second designated position of the field former element (e.g. the position with the second-smallest iris opening), the field former element is positioned such that it presses exactly one of the single pressure switches (signal 1). In the third designated position of the field former element (e.g. the position with the third-smallest iris opening), the field former element is positioned such that it presses exactly two of the single pressure switches (signal 2), etc.

For example, depending on the type of a field former element, some of the switches assigned to this field former element are activated, i.e. in particular pressed, by the mechanical coding which belongs to this field former element. For example, a field forming unit with five different (exchangeable) types of field former elements ("exchangeable disks") comprises four single pressure switches. The first one of the five field former elements (e.g. the field former element with the smallest central opening) is, for example, designed so as to press none of the single pressure switches (signal 0). The second one of the five field former elements (e.g. the field former element with the second-smallest central opening) is, for example, designed such that it presses exactly one of the single pressure switches (signal 1). The third one of five field former elements (e.g. the field former element with the third-smallest central opening) is, for example, designed for pressing exactly two of the single pressure switches (signal 2), etc.

Furthermore, it is proposed that the electronic sensor unit comprises a resistance measurement unit, which is at least configured for sensing, preferably measuring, characteristic ohmic resistances which are allocated to the respective exchangeable disks, in particular for the purpose of capturing a field former element that is currently arranged in the field former receiving unit. This advantageously allows obtaining a reliable and/or cost-efficient implementation of the electronic sensor unit, which moreover preferably has a long lifetime and/or permits a great number of cycles. In particular, each exchangeable disk has a different characteristic ohmic resistance. The resistance measurement unit is in particular embodied as an ohmmeter.

Additionally or alternatively, it is proposed that the electronic sensor unit comprises a transmitter-receiver system, for example an RFID system, for a touch-free identification of types of field former elements and/or for a touch-free localization of positions of field former elements. This advantageously allows obtaining a reliable implementation of the electronic sensor unit, which moreover preferably has a long lifetime and/or permits a particularly great number of cycles. In particular, a transmitter element of the transmitter-receiver system, e.g. an RFID element, is herein allocated to the field former element, for example to each exchangeable disk or to at least one iris lamella of each iris aperture. The transmitter element is configured to be read by a receiver element of the transmitter-receiver system, e. g. an RFID reader. It is then possible to deduct, on the basis of the signal detected by the receiver element, a position of the field former element, in particular the iris lamella, in the field former receiving unit and/or to deduct the type of the field former element, in particular the exchangeable disk, that is arranged in the field former receiving unit. In particular, the transmitter element is connected to the field former element firmly, preferably such that it is not separable without destruction. In particular, the receiver element forms part of the induction heating unit.

Beyond this an induction heating unit for a tool shrink-clamping system is proposed, with the induction coil, with the field forming unit comprising the field former receiving unit, and with the field former element, which is arranged in the field former receiving unit and/or arrangeable in the field former receiving unit, and with the induction heating unit adjustment device. In this way optimal field shaping is advantageously enabled, in particular for different tool holders, preferably differently shaped tool holders, which are heatable by the induction heating unit. Advantageously this allows achieving an especially fast and/or energy-saving shrink-clamping process. Advantageously, an especially reliable continuous operation of the tool shrink-clamping system is achievable by the optimized field shaping, in particular as a risk of overheating can be reduced. Advantageously a particularly user-friendly tool shrink-clamping system can be obtained.

In addition, an adjusting method for an adjustment of at least one field former element of an induction heating unit is proposed, wherein the field former element is configured for shaping and/or shielding an induction magnetic field of an induction coil of the induction heating unit, and wherein a type and/or a position of the field former element in a field former receiving unit of the induction heating unit is detected electronically. This advantageously enables optimal field forming, in particular for different, preferably differently-shaped, tool holders which are heatable by the induction heating unit, by optimal selection of the position of the field former elements (of an opening position of the iris opening of the iris aperture that corresponds to a tool and/or a tool holder) and/or by optimal selection of the field former element type (the corresponding exchangeable disk with the central opening suitable for a tool and/or a tool holder).

It is moreover proposed that a current positioning, in particular a manually variable current positioning, of the field former element is monitored, wherein the current positioning of the field former element is matched with a predetermined positioning of the field former element, which is in particular predetermined by a user via the input unit, and wherein upon detection of a match of the current positioning with the predetermined positioning, an indication of an, in particular individual, indicator element of the indicator unit of the induction heating unit changes from giving the deviation signal to giving the matching signal, which in particular differs from the deviation signal at least color-wise. This advantageously enables an especially simple, clear and/or user-friendly optimized adjustment of the field forming unit for the purpose of achieving the optimal field shape.

The induction heating unit adjustment device according to the invention, the induction heating unit according to the invention and/or the adjusting method according to the invention shall herein not be limited to the application and implementation described above. In particular, for the purpose of fulfilling a functionality that is described here, the induction heating unit adjustment device according to the invention, the induction heating unit according to the invention and/or the adjusting method according to the invention may comprise a number of individual elements, components, method steps and units that differs from a number that is given here.

DRAWINGS

Further advantages will become apparent from the following description of the drawings. In the drawings two exemplary embodiments of the invention are illustrated. The drawings, the description and the claims contain a plurality of features in combination. Someone skilled in the art will purposefully also consider the features separately and will find further expedient combinations.

Figure 2:
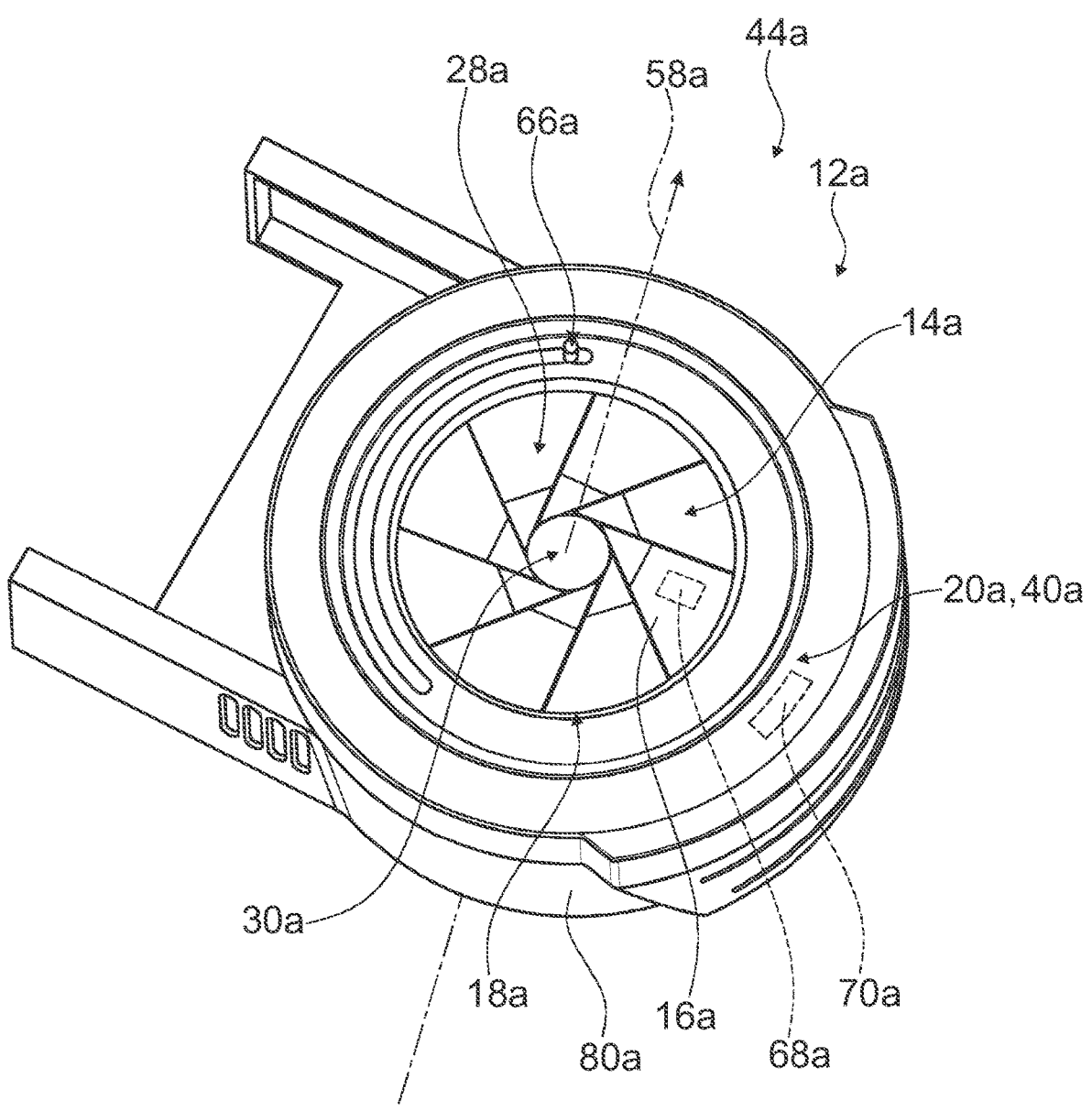
Figure 3A:
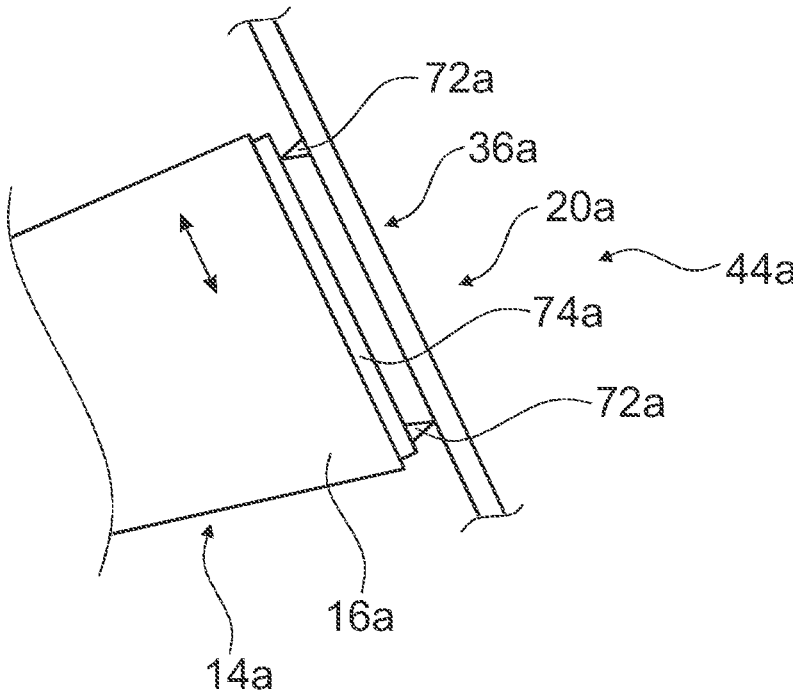
Figure 3B:
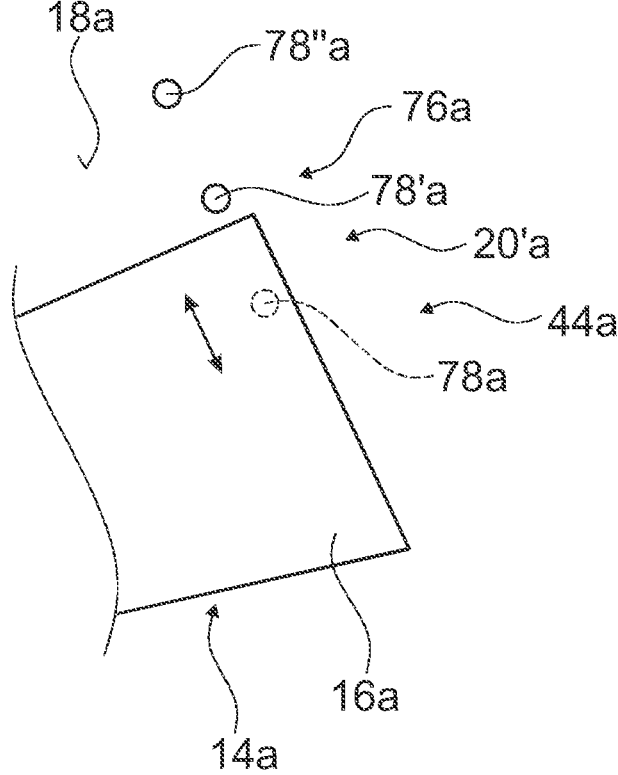

It is shown in:

FIG. 1 a schematic perspective view of a tool shrink-clamping system comprising an induction heating unit with an induction heating unit adjustment device, FIG. 2 a schematic perspective view of the induction heating unit with the induction heating unit adjustment device, FIG. 3a a schematic illustration of an exemplary implementation of an electronic sensor unit of the induction heating unit adjustment device, FIG. 3b a schematic illustration of an exemplary alternative implementation of an electronic sensor unit of the induction heating unit adjustment device,

10

Figure 4:
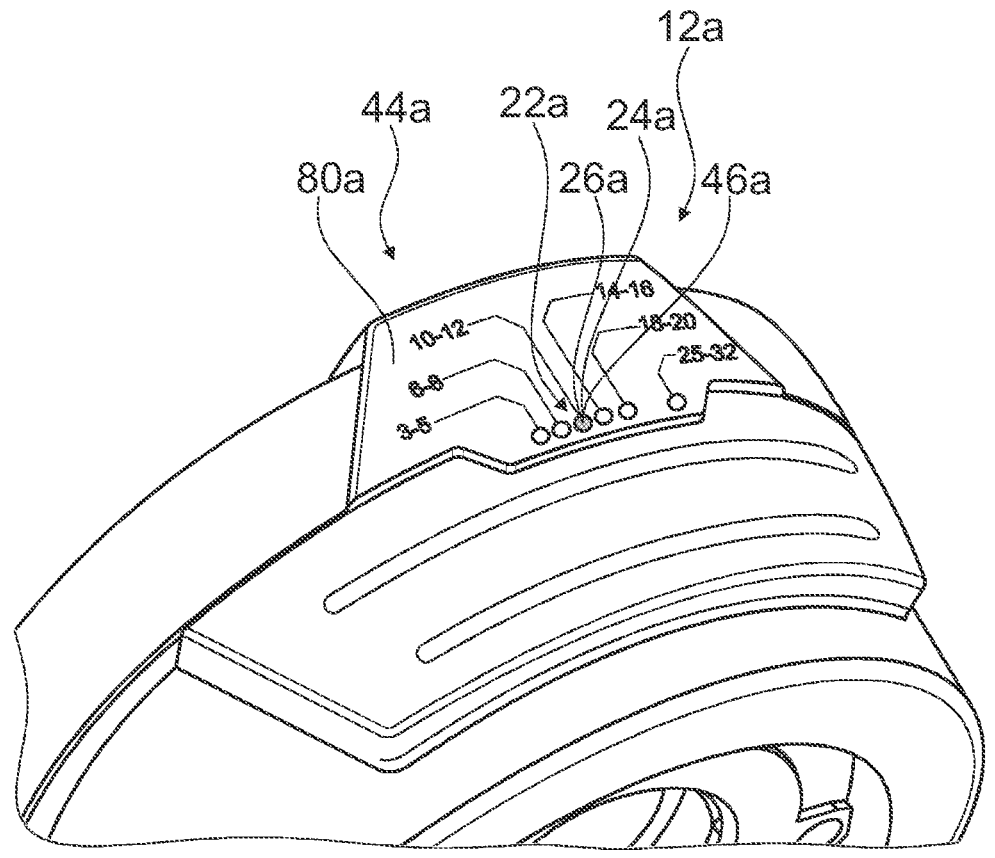
Figure 5:
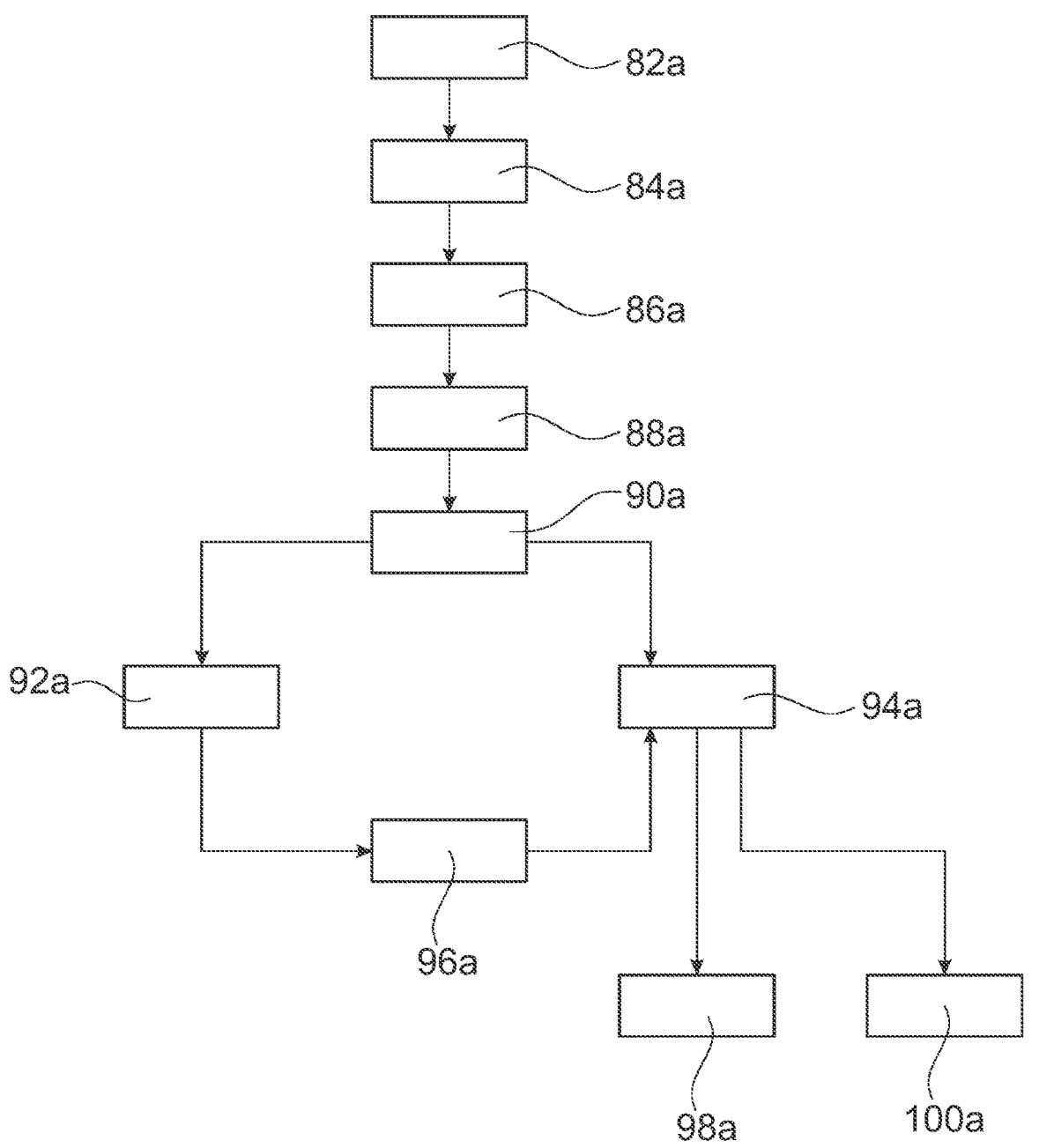
Figure 6:
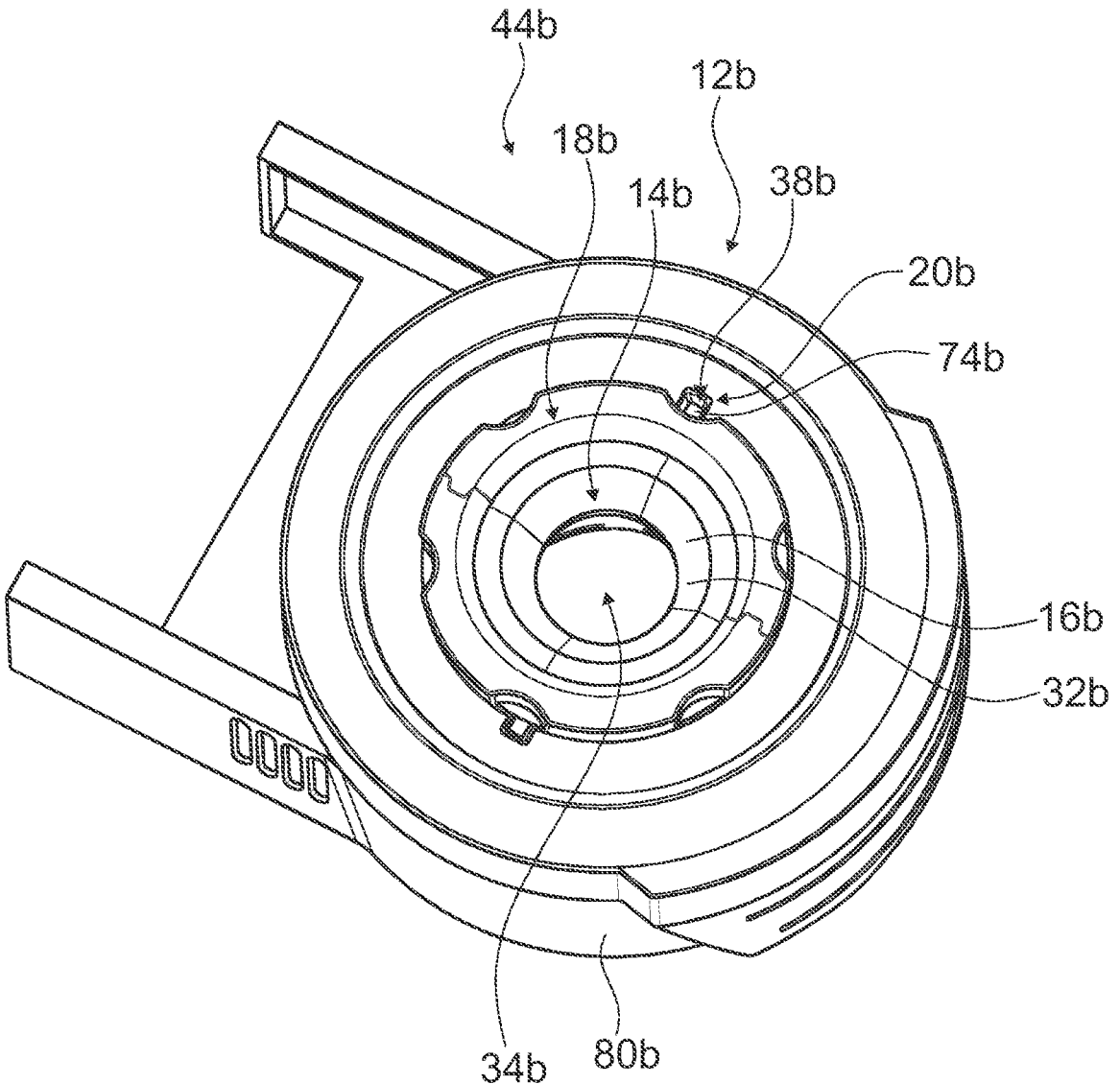

FIG. 4 a schematic perspective view of a portion of the induction heating unit with an indicator unit of the induction heating unit adjustment device, FIG. 5 a schematic flow chart of an adjusting method for an adjustment of at least one field former element of the induction heating unit adjustment device, and FIG. 6 a schematic perspective view of an alternative induction heating unit with an alternative induction heating unit adjustment device.

DESCRIPTION OF THE EXEMPLARY EMBODIMENTS

FIG. 1 shows a schematic perspective view of a tool shrink-clamping system 42a with an induction heating unit adjustment device 44a. The tool shrink-clamping system 42a realizes a shrink-clamping and/or unshrink-unclamping station. The tool shrink-clamping system 42a is configured for an automated shrink-clamping and/or unshrink-unclamping of tools 48a into and/or out of tool holders 50a. The tool shrink-clamping system 42a is configured for an execution of a shrink-clamping process on tools 48a for a fixation of the tools 48a in the tool holders 50a and/or for an execution of an unshrink-unclamping process on tools 48a for a removal of the tools 48a out of tool holders 50a. The tool shrink-clamping system 42a is comprises an induction heating unit 12a. The tool shrink-clamping system 42a comprises a tower unit 62a. The induction heating unit 12a is arranged at the tower unit 62a. The induction heating unit 12a is movable along the tower unit 62a at least in a vertical direction. The induction heating unit 12a is configured for heating the tool holders 50a. The tool holders 50a are embodied as shrink chucks. The tool holders 50a comprise tool receiving regions which the tools 48a are inserted into. The tools 48a are embodied as shaft tools. The tools 48a have a tool shaft 52a. The tools 48a have a work region 54a. The tool receiving regions of the tool holders 50a are configured to receive the tool shaft 52a of a tool 48a. Preferably, in a state when the tool shaft 52a is clamped in the tool holder 50a, the tool shaft 52a is inserted in the tool receiving region of the tool holder 50a almost completely, in particular except for a region that measures maximally 5 mm, preferably maximally 3 mm, preferentially no more than 2 mm. The tool shrink-clamping system 42a comprises a spindle unit 64a. The spindle unit 64a is configured to hold the tool holder 50a relative to the induction heating unit 12a. The spindle unit 64a is rotatable.

The induction heating unit 12a is configured for thermally expanding the tool receiving region of the tool holder 50a in the shrink-clamping process and/or in the unshrink-unclamping process by inductive heating. The induction heating unit 12a comprises an induction coil 10a. The induction heating unit 12a is configured to generate an induction magnetic field. The induction heating unit adjustment device 44a is configured for an adjustment of a field shape of an alternating field, in particular the induction magnetic field, of the induction coil 10a. The induction magnetic field is configured to interact with the material of the tool holder 50a for a heating and thus for an expansion of the tool holder 50a. The induction coil 10a has an opening 56a. The opening 56a of the induction coil 10a is oriented parallel to an axial direction 58a of the induction heating unit 12a. The induction coil 10a comprises coil windings, which are wound around the opening 56a of the induction coil 10a. The tool shrink-clamping system 42a comprises a control and/or regulation unit 60a. The control and/or regulation unit 60a is at least configured for applying an alternating current to the induction coil 10a for the purpose of generating an induction magnetic field.

FIG. 2 shows a schematic perspective view of the induction heating unit 12a with the induction heating unit adjustment device 44a. The induction heating unit adjustment device 44a comprises a field forming unit 14a. The field forming unit 14a is configured for a variable shaping of an induction magnetic field generated by the induction coil 10a (not shown in FIG. 2). The field forming unit 14a is configured for a variable deflection of the induction magnetic field generated by the induction coil 10a. The field forming unit 14a is configured to deflect the induction magnetic field generated by the induction coil 10a in such a way that a preferably small portion of the induction magnetic field, preferentially—if possible—no induction magnetic field, exits from the induction heating unit 12a in the axial direction 58a upwards. The field forming unit 14a is (among other purposes) configured to deflect the induction magnetic field generated by the induction coil 10a in such a way that in an unshrink-unclamping process a tool 48a fastened in a tool holder 50a is heated as little as possible, and is if possible not heated at all. The field forming unit 14a is configured to deflect the induction magnetic field generated by the induction coil 10a in such a way that during the shrink-clamping process and during the unshrink-unclamping process an optimized energy transfer to the tool holder 50a is realized that is as effective and efficient as possible.

The field forming unit 14a comprises a field former receiving unit 18a. The field forming unit 14a comprises a field former element 16a. In the exemplary embodiment illustrated in FIG. 2, the field forming unit 14a comprises a plurality of field former elements 16a, which are in particular implemented at least substantially identically to each other. The field former receiving unit 18a is configured to hold the field former element 16a in and/or on the induction heating unit 12a. The field former elements 16a are arranged in the field former receiving unit 18a. The field former elements 16a are arranged in the field former receiving unit 18a such that they are movable relative to one another and/or relative to the induction coil 10a and/or at least perpendicularly relative to the axial direction 58a. The field former receiving unit 18a, in particular the position of the field former element 16a in the field forming unit 14a, is manually adjustable. The induction heating unit 12a comprises a manual adjustment device 66a. The manual adjustment device 66a is configured for an adjustment of the position of the field former element 16a, preferably of the positions of the field former elements 16a. The field former element 16a that is exemplarily shown in FIG. 2 forms part of an iris aperture 28a. The iris aperture 28a has an iris opening 30a. The iris opening 30a is arranged centrally in the iris aperture 28a. The iris opening 30a is variable in size. The size of the iris opening 30a is adjustable by a movement of the field former elements 16a relative to one another in the field former receiving unit 18a. The iris opening 30a has a plurality of typical opening diameters, which are adapted to defined typical diameters of tool shafts 52a.

The induction heating unit adjustment device 44a comprises an electronic sensor unit 20a. The electronic sensor unit 20a is configured for a sensing of the position, in particular the current position, of the field former element 16a held in and/or on the induction heating unit 12a by the field former receiving unit 18a. The electronic sensor unit 20a is configured to output the sensed position of the field former element 16a as an electronic measurement signal. Alternatively or additionally, the electronic sensor unit 20a may be configured to output a sensed type of an alternative field former element 16b, for example an exchangeable disk 32b (see FIG. 6), as an electronic measurement signal.

The electronic sensor unit 20a comprises a transmitter-receiver system 40a. The transmitter-receiver system 40a is implemented as an RFID system. The transmitter-receiver system 40a is configured for a touch-free localization of positions of field former elements 16a. Alternatively or additionally, the transmitter-receiver system 40a may be configured to identify types of field former elements 16b, for example exchangeable disks 32b (see FIG. 6). The transmitter-receiver system 40a comprises a transmitter unit 68a. The transmitter unit 68a is embodied as an RFID chip. The transmitter unit 68a is fixedly connected to the movable field former element 16a. The transmitter unit 68a is configured for a transmission of a position information of the field former element 16a. Alternatively, the transmitter unit 68a may be configured for a transmission of a type information regarding a field former element 16b that is embodied as an exchangeable disk 32b. The transmitter-receiver system 40a comprises a receiver unit 70a. The receiver unit 70a is embodied as an RFID reader. The receiver unit 70a is configured for receiving the position information of the field former element 16a sent out by the transmitter unit 68a and/or the type information regarding the field former element 16a sent out by the transmitter unit 68a. The receiver unit 70a is configured to forward the received position information and/or type information to the control and/or regulation unit 60a for further processing. However, the electronic sensor unit 20a may also be implemented free of a transmitter-receiver system 40a, in particular free of an RFID system, and may for example be based just on one of the measurement principles which will be described below.

FIG. 3a schematically shows an exemplary implementation of the electronic sensor unit 20a. The electronic sensor unit 20a comprises a potentiometer 36a. The potentiometer 36a is configured to capture a respective current position of the field former element 16a in the field former receiving unit 18a. The potentiometer 36a comprises slide contacts 72a, which pick up a resistance of a resistor element 74a, which is variable by the field former element 16a depending on its current position (wherein the current position is in this case shown as a translational position but may as well be a rotational position or a mix of rotation and translation). The current value of the resistance of the resistor element 74a picked up by the potentiometer 36a permits a deduction of the position of the field former element 16a, and thus a deduction of the size of the iris opening 30a. The current value of the resistance of the resistor element 74a picked up by the potentiometer 36a is transmitted to the control and/or regulation unit 60a for, among other purposes, a controlling of an indicator element 46a of an indicator unit 22a (see FIG. 4). Alternatively or additionally, the potentiometer 36a may also be configured for a capturing of a type of a field former element 16b (see FIG. 6), which is currently arranged in the field former receiving unit 18b and is embodied as an exchangeable disk 32b. In the case of exchangeable disks 32b, each exchangeable disk 32b would, instead of slide contacts 72a, have immobile contacts which are arranged on each exchangeable disk 32b in a different place, such that for each exchangeable disk 32b there would be different resistances at the potentiometer 36a, and a deduction of the respective exchangeable disk 32b would be possible from said different resistances.

FIG. 3b schematically shows an alternative exemplary implementation of the electronic sensor unit 20'a. The electronic sensor unit 20'a comprises a switch array 76a. The switch array 76a comprises three switches 78a, 78'a, 78''a.

A greater or smaller number of switches 78*a*, 78'*a*, 78"*a* is of course conceivable. The number of switches 78*a*, 78'*a*, 78"*a* may predetermine a number of designated positions of the field former elements 16*a* and thus a number of designated opening sizes of the iris opening 30*a*. The switches 78*a*, 78'*a*, 78"*a* are arranged separately from the field former element 16*a*. The switches 78*a*, 78'*a*, 78"*a* are arranged on a surface of the field former receiving unit 18*a*. The switches 78*a*, 78'*a*, 78"*a* are embodied as pressure switches. Alternatively to pressure switches, other implementations of switches are conceivable, which are known to someone skilled in the art and have switching principles different than a pressure switch. The switch array 76*a* is configured to capture a respective current position of the field former element 16*a* in the field former receiving unit 18*a*. In a movement of the field former element 16*a*, e.g. for changing the size of the iris opening 30*a*, the field former element 16*a* sweeps over one or several of the switches 78*a*, 78'*a*, 78"*a* of the switch array 76*a*. In the exemplary illustration of FIG. 3*b*, a switch 78*a* of the switch array 76*a* is actuated by the field former element 16*a*. In the exemplary illustration of FIG. 3*b*, the two further switches 78'*a*, 78"*a* of the switch array 76*a* are not actuated by the field former element 16*a*. A number of actuated switches 78*a*, 78'*a*, 78"*a* of the switch array 76*a* permits a deduction of the position of the field former element 16*a* and thus of the size of the iris opening 30*a*. A number of actuated switches 78*a*, 78'*a*, 78"*a* of the switch array 76*a* is transmitted to the control and/or regulation unit 60*a*, among other purposes, for a controlling of the indicator element 46*a* of the indicator unit 22*a* (see FIG. 4). Alternative arrangements of the switches 78*a*, 78'*a*, 78"*a* are conceivable, for example with respect to a circumference of the field former elements 16*a*. It is moreover conceivable that the field former element 16*a* comprises a stud or something like that (not shown), which is configured for an actuation of the switches 78*a*, 78'*a*, 78"*a* during a sweeping of the switches 78*a*, 78'*a*, 78"*a*. Alternatively, it is for example also conceivable that the field former element 16*a* has holes (not shown), which during a sweeping over the switches 78*a*, 78'*a*, 78"*a* release an actuation of the switches 78*a*, 78'*a*, 78"*a* in certain designated positions of the field former elements 16*a* and thus indicate preferred positions of the field former elements 16*a*. Alternatively or additionally, the switch array 76*a* may also be configured for a capturing of a type of field former element 16*b* (see FIG. 6) that is currently arranged in the field former receiving unit 18*b* and is embodied as an exchangeable disk 32*b*. In the case of exchangeable disks 32*b*, each exchangeable disk 32*b* would, for example, have a specific counter array (e.g. implemented as holes or studs or something like that), which actuates a certain switch combination of the switch array 76*a*, by which a recognition of the respective exchangeable disk 32*b* is possible.

FIG. 4 shows a portion of the induction heating unit 12*a* with the induction heating unit adjustment device 44*a*. The induction heating unit 12*a* comprises a housing 80*a*. The housing 80*a* encompasses at least the induction coil 10*a*. The housing 80*a* encompasses the field former receiving unit 18*a* at least in a circumferential direction. The housing 80*a* encompasses the field former elements 16*a* at least in a circumferential direction. The induction heating unit adjustment device 44*a* comprises the indicator unit 22*a*. The indicator unit 22*a* is configured for outputting by an indicator signal the position of the field former element 16*a* that is monitored and/or sensed by the electronic sensor unit 20*a*. The indicator unit 22*a* is configured to indicate by a selection signal a pre-selection of a position for the field former element 16*a*, in particular a designated position of the field former element 16*a* adjusted by a user via an input unit (not shown) of the tool shrink-clamping system 42*a*. The indicator unit 22*a* is configured to indicate by a deviation signal a deviation from a pre-selected position of the field former element 16*a*, in particular a deviation from a pre-selected size of the iris opening 30*a*. The indicator unit 22*a* is configured to indicate by a matching signal a match with the pre-selected position of the field former element 16*a*, in particular a match with the pre-selected size of the iris opening 30*a*. In the case of an exchangeable disk 32*b* (see FIG. 6), the indicator unit 22*a* is alternatively configured to indicate by an indicator signal the type of the field former element 16*b*, preferably the type of the exchangeable disk 32*b*, that is monitored and/or sensed by the electronic sensor unit 20*a*. The indicator unit 22*a* is in this case configured to indicate by the selection signal a type pre-selection for the field former element 16*b*, in particular a designated exchangeable disk 32*b* adjusted by a user via the input unit of the tool shrink-clamping system 42*a*. The indicator unit 22*a* is in this case configured to indicate by the deviation signal a deviation from a pre-selected type of the field former element 16*b*, in particular a deviation from a pre-selected exchangeable disk 32*b*. The indicator unit 22*b* is in this case configured to indicate by the matching signal a match with the pre-selected type of the field former element 16*b*, in particular a match with the pre-selected exchangeable disk 32*b*.

The indicator unit 22*a* comprises luminous elements 24*a*. The luminous elements 24*a* are embodied as LEDs. The luminous elements 24*a* are arranged on an outer side of the housing 80*a*. The luminous elements 24*a* are arranged in a row. In the exemplary embodiment illustrated in FIG. 4, the indicator unit 22*a* comprises six luminous elements 24*a*. The luminous elements 24*a* realize color-changing elements 26*a*. The luminous elements 24*a* are configured to output the indicator signals, in particular the selection signal, the deviation signal and the matching signal. The luminous elements 24*a* are configured to output the indicator signals by presenting different colors and/or by selecting which of the luminous elements 24*a* of the indicator unit 22*a* is/are illuminated. The deviation signal is implemented as a red glow of the color-changing element 26*a*. The matching signal is implemented as a green glow of the color-changing element 26*a*. The luminous elements 24*a* are respectively assigned to certain tool shaft sizes (shown in FIG. 4 as numeric values) and/or pre-selections. The selection signal is implemented as a glow of that luminous element 24*a* of the plurality of luminous elements 24*a* which corresponds to the tool shaft size and/or pre-selection that has been pre-selected by the user.

The indicator unit 22*a*, in particular the indicator signals outputted by the luminous elements 24*a* of the indicator unit 22*a*, is/are controlled by the control and/or regulation unit 60*a*. The electronic sensor unit 20*a* is configured for monitoring a manual adjustment process which influences the type of the field former element 16*b* (see FIG. 6) or the position of the field former element 16*a*. The indicator unit 22*a* is configured to output the deviation signal or the matching signal via the color-changing element 26*a* depending on a matching of the type of the field former element 16*b* or depending on a matching of the position of the field former element 16*a* with the pre-selection.

FIG. 5 shows a schematic flow chart of an adjusting method for an adjustment of at least one field former element 16*a* of the induction heating unit adjustment device 44*a*, in particular of the induction heating unit 12*a*. In at least one method step 82a a pre-selection is made by a user, comprising for example a diameter of a tool shaft 52a of a tool 48a that is to be shrink-clamped by the tool shrink-clamping system 42a or of a tool 48a that is to be unshrunk-unclamped by the tool shrink-clamping system 42a, a desired size of the iris opening 30a and/or, in the case of exchangeable disks 32b, a desired size of a central opening 34b of the exchangeable disk 32b. The user imparts the pre-selection to the tool shrink-clamping system 42a by means of the input unit. In at least one further method step 84a the pre-selection is processed by the control and/or regulation unit 60a. In the method step 84a the indicator unit 22a is actuated by the control and/or regulation unit 60a for outputting the selection signal. In at least one further method step 86a the selection signal is indicated by the indicator unit 22a. In the method step 86a the luminous element 24a of the indicator unit 22a lights up which corresponds to the pre-selection, in particular the diameter of the tool shaft 52a selected in the method step 82a, the desired size of the iris opening 30a selected in the method step 82a and/or, in the case of exchangeable disks 32b, the desired exchangeable disk 32b selected in the method step 82a. All further luminous elements 24a of the indicator unit 22a, in particular all further luminous elements 24a of the indicator unit 22a which indicate further diameters of tool shafts 52a, further sizes of iris openings 30a and/or, in the case of exchangeable disks 32b, further exchangeable disks 32b having different central openings 34b, remain dark and/or without illumination. In at least one further method step 88a the position of the field former element 16a in the field former receiving unit 18a of the induction heating unit 12a and/or, in the case of exchangeable disks 32b, the type of the field former element 16b in the field former receiving unit 18b, in particular the inserted exchangeable disk 32b, are/is detected electronically. In the method step 88a a manually variable current positioning of the field former element 16a is monitored. In at least one further method step 90a the electronic measurement signal obtained in the method step 88a is matched with the pre-selection made in the method step 82a. In the method step 90a the current positioning of the field former element 16a is matched with a predetermined positioning of the field former element 16a. In the case of exchangeable disks 32b, an exchangeable disk 32b currently positioned in the field former receiving unit 18b is matched in the method step 90a with a predetermination for an exchangeable disk 32b that is to be positioned. In at least one further method step 92a, upon detection of a deviation of the measurement signal from the pre-selection and/or from the predetermination, the deviation signal is emitted by the single illuminated luminous element 24a, in particular the luminous element 24a which emits the selection signal. In the method step 92a the luminous element 24a, which is in particular assigned to the pre-selected diameter of tool shafts 52a, to the pre-selected sizes of iris openings 30a and/or, in the case of exchangeable disks 32b, to pre-selected exchangeable disk 32b, will glow red. In at least one further method step 94a, which is in particular alternative to the method step 92a, upon detection of a match of the measurement signal with the pre-selection and/or with the predetermination, the matching signal is emitted by the single illuminated luminous element 24a, in particular by the luminous element 24a which emits the selection signal. In the method step 94a the luminous element 24a, which is in particular assigned to the pre-selected diameter of tool shafts 52a, the pre-selected size of iris openings 30a and/or, in the case of exchangeable disks 32b, the pre-selected exchangeable disk 32b, will glow green. In at least one further method step 96a, in particular in a reaction to the method step 92a, the position of the field former element 16a in the field former receiving unit 18a or, in the case of exchangeable disks 32b, the type of exchangeable disk 32b is changed manually by the user. In the method step 96a, upon detection of a match brought about by the manual change made by the user, e.g. a match of the current positioning with the predetermined positioning or, in the case of exchangeable disks 32b, upon detection of a match of the pre-selected exchangeable disk 32b with the exchangeable disk 32b currently inserted in the field former receiving unit 18a, the indication of the individual indicator element 46a of the indicator unit 22a, in particular of the luminous element 24a indicating the selection signal, changes from presenting the deviation signal to presenting the matching signal, which differs from the deviation signal color-wise. In at least one further method step 98a following the method step 94a, a shrink-clamping process for a fixation of a tool 48a in a tool holder 50a is carried out by the tool shrink-clamping system 42a with the induction heating unit adjustment device 44a. Alternatively, in at least one further method step 100a following the method step 94a, an unshrink-unclamping process for a release of a tool 48a out of a tool holder 50a is carried out by the tool shrink-clamping system 42a with the induction heating unit adjustment device 44a.

In FIG. 6 a further exemplary embodiment of the invention is shown. The following descriptions and the drawings are essentially limited to the differences between the exemplary embodiments, wherein regarding components having the same denomination, in particular regarding components having the same reference numerals, the drawings and/or the description of the other exemplary embodiment, in particular of FIGS. 1 to 5, may principally be referred to. In order to distinguish between the exemplary embodiments, the letter a has been added to the reference numerals of the exemplary embodiment in FIGS. 1 to 5. In the exemplary embodiment of FIG. 6 the letter a has been replaced by the letter b. In the above description of figures, the further exemplary embodiment was already referred to in parts, wherein the respective passages were already earmarked in each case by using the suffix b in the respective reference numerals.

FIG. 6 shows a schematic perspective view of an alternative induction heating unit 12b with an alternative induction heating unit adjustment device 44b. The induction heating unit adjustment device 44b comprises a field forming unit 14b. The field forming unit 14b comprises a field former receiving unit 18b. The field forming unit 14b comprises a field former element 16b. In the exemplary embodiment illustrated in FIG. 6, the field former element 16b is embodied as an exchangeable disk 32b of a plurality of exchangeable disks 32b, which are exchangeably insertable in the field former receiving unit 18b and in each case have a differently sized opening 34b. At least one of the exchangeable disks 32b may be divided into two or more portions which, during insertion into the field former receiving unit 18b, are combined to form together the exchangeable disk 32b for the purpose of enabling an unshrink-unclamping of shouldered tools 48b, i.e. in particular tools 48b in which, in a work region 54b of the tool 48b, a cutter diameter is greater than a diameter of a tool shaft 52b of the tool 48b.

The induction heating unit adjustment device 44b comprises an electronic sensor unit 20b. The electronic sensor unit 20b is configured to output a sensed type of the field former element 16b, in particular of the exchangeable disk 32b, as an electronic measurement signal. The electronic sensor unit 20*b* comprises a resistance measurement unit 38*b*. The resistance measurement unit 38*b* is configured for sensing characteristic ohmic resistances, which are assigned to the respective exchangeable disks 32*b*, for a capturing of a field former element 16*b* that is currently arranged in the field former receiving unit 18*b*. The exchangeable disks 32*b* comprise resistor elements 74*b*. Each exchangeable disk 32*b* comprises a resistor element 74*b* having a substantially different ohmic resistance. The resistance measurement unit 38*b* is configured, in particular in a cooperation with a control and/or regulation unit 60*b*, to identify the respective exchangeable disks 32*b*, and thus preferably also the respective opening sizes of the opening 34*b*.

REFERENCE NUMERALS

10 induction coil
12 induction heating unit
14 field forming unit
16 field former element
18 field former receiving unit
20 electronic sensor unit
22 indicator unit
24 luminous element
26 color-changing element
28 iris aperture
30 iris opening
32 exchangeable disk
34 opening
36 potentiometer
38 resistance measurement unit
40 transmitter-receiver system
42 tool shrink-clamping system
44 induction heating unit adjustment device
46 indicator element
48 tool
50 tool holder
52 tool shaft
54 work region
56 opening
58 axial direction
60 control and/or regulation unit
62 tower unit
64 spindle unit
66 manual adjustment unit
68 transmitter unit
70 receiver unit
72 slide contact
74 resistor element
76 switch array
78 switch
80 housing
82 method step
84 method step
86 method step
88 method step
90 method step
92 method step
94 method step
96 method step
98 method step
100 method step

The invention claimed is:
1. An induction heating unit adjustment device for an adjustment of at least one field shape of an alternating field of an induction coil of an induction heating unit, having a field forming unit which is configured for a shaping and/or shielding of the alternating field generated by the induction coil, the field forming unit comprising an exclusively manually operable field former receiving unit, holding field former elements movably and/or exchangeably in and/or on the induction heating unit and comprising movably supported field former elements, forming at least a portion of an iris aperture with an iris opening that is variable in size or comprising different exchangeable field former elements, forming at least a portion of an exchangeable disk of a plurality of exchangeable disks which are exchangeably insertable in the field former receiving unit and which in each case have a differently sized opening, the induction heating unit adjustment device further having an electronic sensor unit, which is configured for sensing a type and/or a position of the field former element that is held in and/or on the induction heating unit by the field former receiving unit, and for outputting an electronic measurement signal, the induction heating unit adjustment device further having an indicator unit, which is configured to output the type of field former element, meaning which field former element from a selection of a plurality of field former elements is positioned in the field former receiving unit, and/or a currently occupied rotational and/or translational position of the rotationally and/or translationally movable field former element relative to the induction coil that is monitored and/or sensed by the electronic sensor unit, wherein the indicator unit is configured to indicate a deviation of the sensed type of field former element from a pre-selected type of the field former element and/or a deviation from a pre-selected rotational and/or translational position of the rotationally and/or translationally movable field former element relative to the induction coil by means of a deviation signal, or wherein the indicator unit is configured to indicate a match of the sensed type of field former element with a pre-selected type of the field former element and/or a match with a pre-selected rotational and/or translational position of the rotationally and/or translationally movable field former element relative to the induction coil by means of a matching signal.

2. The induction heating unit adjustment device according to claim 1, wherein the indicator unit comprises at least one luminous element.

3. The induction heating unit adjustment device according to claim 1, wherein the indicator unit comprises at least one color-changing element.

4. The induction heating unit adjustment device according to claim 1, wherein the indicator unit comprises at least one color-changing element, wherein the indicator unit is configured to indicate a deviation from a pre-selected type of the field former element and/or a deviation from a pre-selected position of the field former element by means of a deviation signal, and wherein the electronic sensor unit is configured to monitor an adjustment process that influences the type or the position of the field former element and, depending on a matching of the type or the position of the field former element with the pre-selection, to output the deviation signal or the matching signal by means of the color-changing element.

5. The induction heating unit adjustment device according to claim 1, wherein the electronic sensor unit comprises a potentiometer for a capturing of a respective current position of the field former element in the field former receiving unit and/or for a capturing of a type of the field former element that is currently arranged in the field former receiving unit.

6. The induction heating unit adjustment device according to claim 1, wherein the electronic sensor unit comprises a resistance measurement unit, which is at least configured for sensing characteristic ohmic resistances which are allocated to the respective exchangeable disks for a capturing of a field former element that is currently arranged in the field former receiving unit.

7. The induction heating unit adjustment device according to claim 1, wherein the electronic sensor unit comprises a transmitter-receiver system for a touch-free identification of types of field former elements and/or for a touch-free localization of positions of field former elements.

8. An induction heating unit adjustment device for an adjustment of at least one field shape of an alternating field of an induction coil of an induction heating unit,
having a field forming unit which is configured for a shaping and/or shielding of the alternating field generated by the induction coil, the field forming unit comprising a field former receiving unit, holding field former elements movably and/or exchangeably in and/or on the induction heating unit and comprising movably supported field former elements, forming at least a portion of an iris aperture with an iris opening that is variable in size or comprising different exchangeable field former elements, forming at least a portion of an exchangeable disk of a plurality of exchangeable disks which are exchangeably insertable in the field former receiving unit and which in each case have a differently sized opening, the induction heating unit adjustment device further having an electronic sensor unit, which is configured for sensing a type of field former element, meaning which field former element from a selection of a plurality of field former elements is positioned in the field former receiving unit, and/or which is configured for sensing a currently occupied rotational and/or translational position relative to the induction coil of the rotationally and/or translationally movable field former element that is held in and/or on the induction heating unit by the field former receiving unit, and for outputting an electronic measurement signal, the induction heating unit adjustment device further comprising an indicator unit, which is configured to output the type of field former element and/or the currently occupied rotational and/or translational position of the rotationally and/or translationally movable field former element relative to the induction coil that is monitored and/or sensed by the electronic sensor unit, wherein the indicator unit is configured to indicate a deviation of the sensed type of field former element from a pre-selected type of the field former element and/or a deviation of the sensed currently occupied rotational and/or translational position relative to the induction coil of the field former element from a pre-selected rotational and/or translational position of the rotationally and/or translationally movable field former element relative to the induction coil by means of a deviation signal or wherein the indicator unit is configured to indicate a match of the sensed type of field former element with a pre-selected type of the field former element and/or a match of the sensed currently occupied rotational and/or translational position relative to the induction coil of the field former element with a pre-selected rotational and/or translational position of the rotationally and/or translationally movable field former element relative to the induction coil by means of a matching signal.

9. An induction heating unit adjustment device for an adjustment of at least one field shape of an alternating field of an induction coil of an induction heating unit, having a field forming unit which is configured for a shaping and/or shielding of the alternating field generated by the induction coil, the field forming unit comprising an exclusively manually operable field former receiving unit, holding field former elements movably and/or exchangeably in and/or on the induction heating unit and comprising movably supported field former elements, forming at least a portion of an iris aperture with an iris opening that is variable in size or comprising different exchangeable field former elements, forming at least a portion of an exchangeable disk of a plurality of exchangeable disks which are exchangeably insertable in the field former receiving unit and which in each case have a differently sized opening, the induction heating unit adjustment device further having an electronic sensor unit, which is configured for sensing a type and/or a position of the field former element that is held in and/or on the induction heating unit by the field former receiving unit, and for outputting an electronic measurement signal, wherein the indicator unit comprises at least one color-changing element, wherein the indicator unit is configured to indicate a deviation from a pre-selected type of the field former element and/or a deviation from a pre-selected position of the field former element by means of a deviation signal, and wherein the electronic sensor unit is configured to monitor an adjustment process that influences the type or the position of the field former element and, depending on a matching of the type or the position of the field former element with the pre-selection, to output the deviation signal or the matching signal by means of the color-changing element.

\* \* \* \* \*